Figure 1:
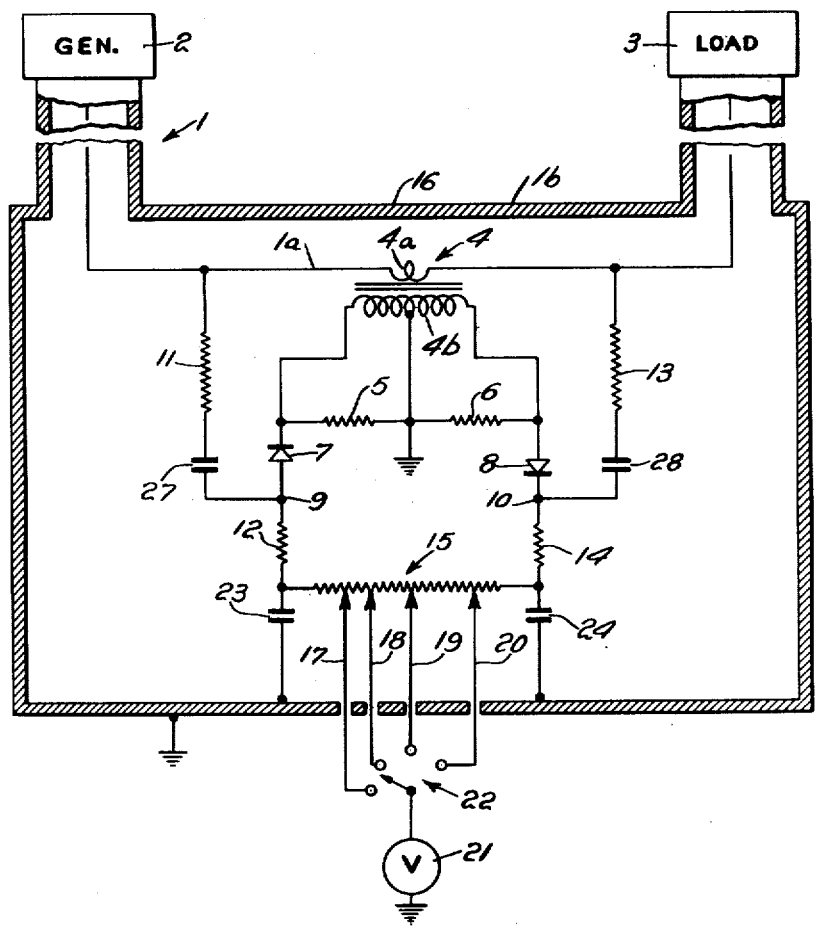

June 25, 1957    R. T. ADAMS ET AL    2,797,387
STANDING WAVE RATIO MONITOR
Filed Aug. 4, 1953    3 Sheets-Sheet 1

INVENTORS
ROBERT T. ADAMS
ALEXANDER HORVATH
BY BENJAMIN PARZEN

Ernest Hanwick
ATTORNEY

INVENTORS
ROBERT T. ADAMS
ALEXANDER HORVATH
BENJAMIN PARZEN
BY
Ernest Janunik
ATTORNEY

INVENTORS
ROBERT T. ADAMS
ALEXANDER HORVATH
BENJAMIN PARZEN
BY
ATTORNEY

United States Patent Office 2,797,387
Patented June 25, 1957

2,797,387

STANDING WAVE RATIO MONITOR

Robert T. Adams, Short Hills, and Alexander Horvath, Clifton, N. J., and Benjamin Parzen, Woodside, N. Y., assignors to International Telephone and Telegraph Corporation, a corporation of Maryland Application August 4, 1953, Serial No. 372,334

6 Claims. (Cl. 324—58)

This invention relates generally to standing wave ratio monitors for use with high frequency wave transmission lines and more particularly to substantially non-frequency sensitive standing wave ratio monitors.

A customary measurement often made on high frequency transmission lines is the standing wave ratio. The same information obtained from standing wave ratio measurements may also be obtained from a reflectometer which measures the reflection coefficient, that is, the ratio of the forward and backward or incident and reflected travelling wave magnitude present on the transmission line. Usually the standing wave ratio has been obtained by using a movable probe to determine the wave magnitude at various predetermined points along a transmission line. Movable elements in high frequency transmission lines are undesirable because of the difficulties arising from imperfect electrical contact between the line and the movable element which introduces considerable error in standing wave measurements. In addition, such movable probe devices require at least two consecutive measurements of wave magnitude to be made at different points along the transmission line.

Attempts to measure separately the magnitude of the forward and backward travelling waves without the necessity of adjusting a probe element have been limited to measurements at a single frequency, or to apparatus wherein the transmitted energy is continuously coupled to the measuring device of distances comparable to one half or, preferably, several wavelengths at the operating frequency.

The operation of a reflectometer or directional coupler depends on the fundamental relationship between voltage and current at any point on a transmission line. The line voltage and current may be measured and combined by various means. Theoretically, it is merely necessary to derive a voltage proportional to line current and combine it with a suitable fraction of the line voltage. In practice great difficulty has been encountered in obtaining the voltage proportional to line current in correct phase relationship and referred to ground potential. One of the simplest techniques used in the past was to provide an inductive coupling loop as the current element, terminated in a resistance much greater than the loop reactance. Such a design provided a small voltage having very nearly a 90° phase difference to the line current and varying approximately proportional to the frequency. A small capacitive coupling was used for the voltage element to match the phase angle and frequency characteristics of the current loop. The resultant sum and difference voltages obtained correctly represented the incident and reflected waves, except for a factor proportional to frequency and a near 90° phase shift.

Apparatus such as described above which permits the separate measurements of the magnitudes of forward and backward travelling waves in a transmission line or waveguide employed pickup coupling means of opposite signs for detecting separately the forward and backward travelling waves, but the couplings were either inductive or capacitive and of opposite signs. In either case such known apparatus required that fixed complementary inductive or capacitive coupling between the transmission line and measurement device be provided.

One of the objects of this invention, therefore, is to provide a standing wave ratio monitor whose output is independent of frequency and responsive to voltages which are fixed fractions of the line voltage and proportional to line current.

Another object of this invention is to provide a reflectometer which utilizes two bridge circuits to obtain two direct current voltages proportional to the incident and reflected waves on a transmission line.

A further object of this invention is to provide a standing wave ratio monitor using a fixed resistive voltage divider as the voltage element and the voltage drop across a resistor isolated from the line by a transformer as the equivalent of the current element.

A feature of the standing wave ratio monitor of this invention is the use of two direct current voltages proportional to the incident and reflected waves on a transmission line. Each voltage is obtained from a bridge circuit made up in part from a fixed voltage divider and a resistor which is not inserted directly in series with the transmission line, but is isolated by a transformer which also provides a convenient impedance change. The polarities of two detectors are chosen to make the voltage proportional to the incident wave positive and the voltage proportional to the reflected wave negative with respect to ground potential. The two voltages are then added algebraically in a potentiometer circuit which is adjusted so that it is balanced for a predetermined ratio of reflected to incident voltage. When the voltage ratio exceeds the predetermined value the output unbalanced voltage is negative while for voltage ratios less than the predetermined value the output is positive. The magnitude of the output voltage depends on the power level on the transmission line, as well as the reflected ratio but the polarity of the output voltage is solely dependent upon the ratio of reflected to incident wave voltage.

Figure 2A:
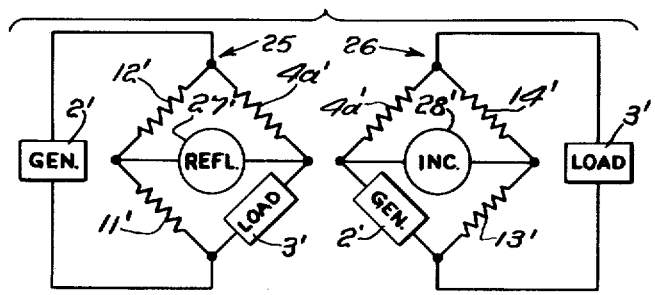
Figure 2B:
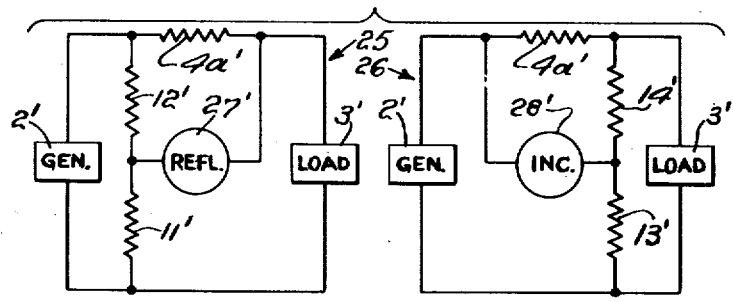
Figure 2C:
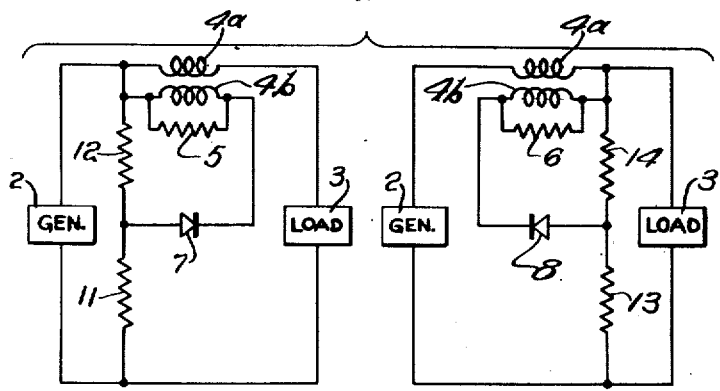
Figure 2D:
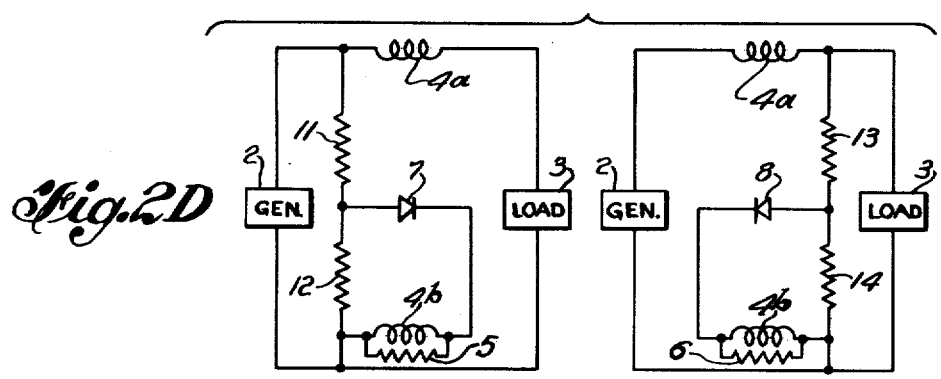
Figure 2E:
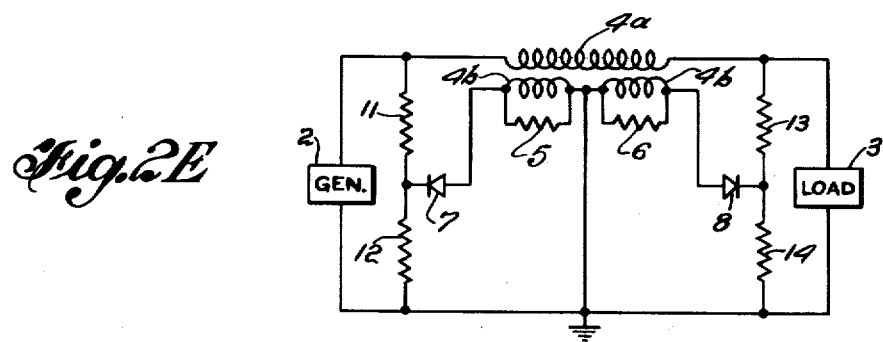
Figure 3:
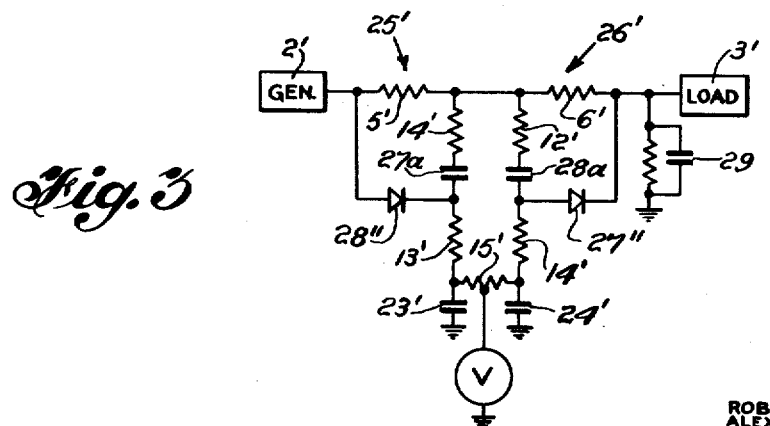

The above-mentioned and other features and objects of this invention will become more apparent by reference to the following description taken in conjunction with the accompanying drawings, in which:

Fig. 1 of the drawing is a schematic circuit diagram of the standing wave ratio monitor of this invention;

Figs. 2A—2E are schematic circuit diagrams of the development of the ratio monitor of Fig. 1 from two bridge circuits; and Fig. 3 is an alternate embodiment of the standing wave ratio monitor of this invention.

Referring to Fig. 1 of the drawing a standing wave ratio monitor in accordance with the principles of this invention is shown for use in monitoring the standing wave ratio present on a coaxial transmission line 1 coupling a source of high frequency energy 2, which may comprise a transmitter or generator equipment, to a load 3 such as an antenna. The current transformer 4 has a single turn primary winding 4a which is connected in series with the inner conductor 1a of the transmission line 1. A center tap secondary winding 4b of the transformer 4 provides a voltage across resistors 5 and 6 in both a positive and negative phase with respect to the grounded outer conductor 1b and the center tap of secondary winding 4b, proportional to the current in the transmission line 1. Two detectors 7 and 8 are poled to give direct current outputs of opposite sign at points 9 and 10. Voltage dividers 11, 12 and 13, 14 are utilized to obtain voltages proportional to the voltage present on transmission line 1. A potentiometer 15 is coupled between the resistors 12 and 14 and is tapped at a plurality of points by contacts 17, 18, 19 and 20. Each of the contacts 17—20 is coupled to a direct current voltmeter 21 or other utilizing means such as a relay by means of a switch 22.

Referring to Figs. 2A to 2E, the standing wave ratio monitor of this invention is shown to be essentially developed from two well-known bridge circuits. In Fig. 2A there is shown two ordinary Wheatstone bridge circuits 25 and 26. If a generator 2' is connected across opposite junctions of a bridge circuit having four resistance arms 11', 12', 4a' and 3' (3' being the load) and a meter 27' is coupled to the remaining terminals, the meter deflection is proportioned to the reflected travelling wave in the transmission line. In a similar manner when the generator 2' is one leg of the bridge and the load 3' is coupled across opposite junctions the meter 28' will measure the incident travelling wave. Referring to Fig. 2B, the bridge circuits illustrated therein are identical with the circuits shown in Fig. 2A but have been rearranged. Referring to Fig. 2C, the equivalent bridge circuits of Fig. 2B are shown but the component parts have been replaced with the equivalent parts from the circuit shown in Fig. 1. Thus resistance 4a' is replaced by current transformer 4 having a resistance 5 or 6 in shunt with the secondary and the meters 27' and 28' have been replaced by detectors 7 and 8. In Fig. 2D each of the two resistance legs 11, 12 and 13, 14 in each bridge have been inverted. Obviously this does not change the theory of operation of the circuits. In Fig. 2E the two bridge circuits of Fig. 2D have been combined to show that the circuit of Fig. 1 which is equivalent to that shown in Fig. 2E is developed from the two Wheatstone bridge circuits of Fig. 2A.

Referring again to Fig. 1, it is seen that in operation the standing wave ratio monitor of this invention is essentially two bridge circuits 25 and 26 each including a voltage divider to provide an R. F. first voltage proportional to the voltage on the line and a current transformer to provide a second voltage proportional to the current in the line. One of the bridge circuits yields a negative detector voltage proportional to the second voltage minus the first voltage, and therefore proportional to the reflected travelling wave, while the second bridge circuit yields a positive detector voltage proportional to the algebraic sum of the first and second voltages, and therefore proportional to the incident travelling wave. A potentiometer 15 coupled between the two bridge circuits is tapped at predetermined points to provide output direct current voltage indicative of predetermined standing wave ratios.

A toroidal core current transformer 4 has its single turn primary winding 4a in series with the inner conductor 1a of the transmission line 1 thus providing a convenient impedance change. The secondary winding 4b is bridged by resistors 5 and 6 and is center tapped. The voltage drop across resistors 5 and 6 is proportional to the current flow in the transmission line 1, but the voltage drop yielded across resistors 5 and 6 are of opposite sign. The resistors 5 and 6 are not inserted directly in line 1, but are isolated from the line by transformer 4. The two R. F. voltages opposite in phase and proportional to the current in line 1 appear separately on one side of the two oppositely poled crystal detectors 7 and 8. The other side of the detectors 7 and 8 are coupled to the tap points 9 and 10. An R. F. voltage proportional to the voltage on line 1 is obtained at the tap point 9 of a voltage divider comprising resistors 11 and 12. The same R. F. voltage proportional to the voltage on line 1 is obtained at the tap point 10 of a voltage divider comprising resistors 13 and 14. Thus, across the detector 7 there is present an R. F. voltage proportional to the voltage present on line 1, as well as an R. F. potential proportional to the current in line 1. The algebraic addition of the R. F. voltages present across the detector 7 yields a D. C. voltage proportional to the magnitude of the backward or reflected travelling wave on the transmission line 1. Across 8 is present an R. F. voltage proportional to the voltage present on line 1 and an R. F. potential proportional to the current in line 1. The algebraic addition of the voltages across the detector 8 yields a D. C. voltage proportional to the magnitude of the forward or incident travelling wave present on the transmission line 1. The R. F. by-pass capacitors 23, 24, 27, and 28 are provided for direct current blocking only and do not affect the radio frequency operation of the standing wave ratio monitor shown. A potentiometer 15 is coupled between the positive or incident D. C. voltage and the negative or reflected D. C. voltage. The polarities of taps 17—20 provide an output balanced for a plurality of standing wave ratios. For example, tap 18 is adjusted to balance out, or in other words provide a zero direct current output for a standing wave ratio of 2, that is, when the D. C. voltage proportional to the incident travelling wave is equal to one-third of the D. C. voltage proportional to the reflected travelling wave. A second tap may be adjusted for a ratio of the D. C. voltage proportional to reflected wave to the D. C. voltage proportional to the incident wave of 5 to 3 providing a zero output for a 4 to 1 standing wave ratio. If the standing wave ratio exceeds the value determined by the tap or position the output to the voltmeter 21 through switch 22 will be negative while for values less than the predetermined standing wave ratio the output will be positive. The magnitude of the output voltage depends on the power level on the transmission line 1 as well as the ratio of the voltages proportional to the reflected and incident waves, but the polarity of the output voltage relative to any one tap point is determined solely by the voltage ratio independent of power.

Referring to Fig. 3, an alternate embodiment of the standing wave ratio monitor of this invention is shown utilizing resistance coupling instead of the current transformer coupling shown in Fig. 2E. The development of the embodiment shown in Fig. 3 follows from the embodiment shown in Fig. 2B wherein the two circuits 25' and 26' are coupled together via resistance elements 5' and 6'. The voltage dividers are moved to a location between the two circuits 25' and 26' and the rectifying elements or meters 27" and 28" are coupled between the resistance dividers and the transmission line. If necessary, an R. F. blocking device 29 may be inserted on the load side of the transmission line to provide a D. C. return if the load and generator are not coupled together to provide a D. C. return. The embodiment shown in Fig. 3 eliminates the need for a current transformer shown in the embodiment illustrated in Fig. 2B.

While we have described above the principles of our invention in connection with specific apparatus, it is to be clearly understood that this description is made only by way of example and not as a limitation to the scope of our invention as set forth in the objects thereof and in the accompanying claims.

We claim:

1. A device for measuring the ratio of the incident and reflected travelling waves present on a transmission line, connecting an energy source and a load, over a wide frequency range, comprising a transformer having a primary winding connected in series with said line and a center tap secondary winding, a first and second bridge circuit each including said primary winding as the first leg of each bridge said first bridge including said source as the second leg and said second bridge including said load as the second leg, and each bridge including a fixed resistive voltage divider coupled to said transmission line as the third and fourth legs of each bridge, a first resistance element coupled between one side and the center tap of said secondary winding, a second resistance element coupled between the other side and the center tap of said secondary winding to provide a voltage drop across each of said elements proportional to the current flow in said line, first rectifier element coupled to the junction of the third and fourth legs of said first bridge circuits and to said one side of said secondary winding, a second rectifier element coupled to the junction of the third and fourth legs of said second bridge circuit and to said other side of said secondary winding, the output from said first bridge circuit yielding the sum of the voltages across said resistance elements and output of said second bridge circuit yielding the difference of said voltages whereby the output of said first bridge is proportional to said incident wave and the output of said second bridge is proportional to said reflected wave.

2. A device according to claim 1 which further includes a potentiometer having a plurality of output taps each representing a predetermined standing wave ratio equivalent to the ratio of the reflected wave voltage to the incident wave voltage at said predetermined tap position.

3. A reflectometer for measuring the incident and reflected travelling waves present on a transmission line over a wide frequency range comprising a transformer having a primary winding coupled in series with said line and a center tapped secondary winding, resistive means coupled to said primary winding to obtain a first and second voltage each proportional to the voltage present on said line, a pair of resistive elements each coupled between an opposite side and the center tap of said secondary winding, detecting means coupled to a first of said resistive elements to obtain a positive voltage equal to the voltage drop across one of said elements which is proportional to the current in said line, detecting means coupled to a second of said resistive elements to obtain a negative voltage from the voltage drop across the second of said elements proportional to the current in said line, and circuitry means coupling said detecting means to said resistive means to obtain the sum of said positive voltage and said first voltage and the sum of said second voltage and said negative voltage whereby said first sum is proportional to said incident travelling wave and said second sum is proportional to said reflected travelling wave.

4. A device for monitoring standing wave ratio in a transmission line comprising a transformer having a primary winding coupled to said line and a center tapped secondary winding, a pair of resistance elements each coupled between an opposite end and the center tap of said secondary winding for developing first voltage components of opposite sign proportional to line current, a pair of fixed resistance voltage dividers coupled to said line for developing second voltage components proportional to line voltage, a first and second oppositely poled detector element each coupled between points having potentials equal to one of said first voltage components and one of said second voltage components, said detector elements having a total output voltage substantially equal to the algebraic sum of said first and second voltage components.

5. A device for monitoring standing wave ratio in a transmission line comprising a transformer coupled to said line having a primary winding and a center tapped secondary winding, a pair of resistor elements respectively coupled between an opposite end and the center tap of said secondary and isolated from said line by said transformer for devoloping a first and second voltage component of opposite sign each proportional to line current, a fixed resistance voltage divider coupled to said line for developing a third and fourth voltage component each proportional to the line voltage, a first and second detector element, said first detector being coupled between points having a potential equal to said first and third voltage component and said second detector element being coupled between points having a potential equal to said second and fourth voltage component, the output of each of said detectors comprising the addition of said coupled voltage components whereby the output of said first detector is substantially proportional to the voltage of the reflected travelling wave on said line and the output of said second detector is substantially proportional to the voltage of the incident travelling wave on said line.

6. A device for measuring the ratio of the incident and reflected travelling waves present on a transmission line connecting an energy source and a load over a wide frequency range comprising a first and second Wheatstone bridge type circuit each including respectively a fixed resistive voltage divider connected to said transmission line as the first and second legs of each bridge, a pair of resistance elements one coupled between the first leg of the first bridge and the source and the other coupled between the first leg of the second bridge and the load providing the third leg of each of said bridges, the source providing the fourth leg of said first bridge and the load providing the fourth leg of said second bridge, a pair of rectifier elements each coupled respectively to the junction of the third and fourth legs of said bridge circuits and to the junction of said first and second legs of said bridge circuits, the output of said first bridge circuit yielding a voltage proportional to the incident travelling wave on said transmission line and the output of said second bridge circuit yielding a voltage proportional to the reflected travelling wave on said transmission line.

References Cited in the file of this patent

UNITED STATES PATENTS

| 2,575,799 | Doherty et al. | Nov. 20, 1951 |
| 2,585,001 | Frommer | Feb. 12, 1952 |
| 2,588,390 | Jones | Mar. 11, 1952 |

Disclaimer 2,797,387.—*Robert T. Adams*, Short Hills, and *Alexander Horvath*, Clifton, N.J., and *Benjamin Parzen*, Woodside, N.Y. STANDING WAVE RATIO MONITOR. Patent dated June 25, 1957. Disclaimer filed Apr. 9, 1962, by the assignee, *International Telephone and Telegraph Corporation*.

Hereby enters this disclaimer to claim 6 of said patent.

[*Official Gazette May 22, 1962.*]